US008523389B2

(12) United States Patent
Holten et al.

(10) Patent No.: US 8,523,389 B2
(45) Date of Patent: Sep. 3, 2013

(54) ILLUMINATION SYSTEM WITH INCLINED LIGHT SOURCE

(75) Inventors: Petrus Adrianus Josephus Holten, Eindhoven (NL); Vincent Fabriek, Eindhoven (NL); Giorgia Tordini, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 447 days.

(21) Appl. No.: 12/747,521

(22) PCT Filed: Dec. 16, 2008

(86) PCT No.: PCT/IB2008/055335
§ 371 (c)(1),
(2), (4) Date: Jun. 11, 2010

(87) PCT Pub. No.: WO2009/077979
PCT Pub. Date: Jun. 25, 2009

(65) Prior Publication Data
US 2010/0271843 A1    Oct. 28, 2010

(30) Foreign Application Priority Data

Dec. 18, 2007  (EP) .................................... 07123426

(51) Int. Cl.
*F21S 4/00*   (2006.01)
*F21V 5/00*   (2006.01)

(52) U.S. Cl.
USPC ......... 362/246; 362/97.2; 362/97.4; 362/223; 362/240; 362/249.02; 362/84; 362/311.02

(58) Field of Classification Search
USPC ................. 362/545, 97.2–97.4, 223, 217.08, 362/236, 238, 240, 246, 249.02, 84, 311.02
See application file for complete search history.

(56) References Cited

U.S. PATENT DOCUMENTS

| 3,536,905 | A | * | 10/1970 | Ruff et al. ......................... 362/1 |
| 4,298,909 | A |   | 11/1981 | Krieg |
| 4,517,631 | A |   | 5/1985  | Mullins |
| 5,199,782 | A | * | 4/1993  | Johnson et al. ................ 362/147 |
| 5,285,356 | A | * | 2/1994  | Skene et al. ....................... 362/1 |
| 5,709,460 | A | * | 1/1998  | Lester ........................... 362/147 |
| 6,280,054 | B1 | * | 8/2001 | Cassarly et al. ............... 362/231 |
| 6,561,678 | B2 |   | 5/2003 | Loughrey |
| 7,255,459 | B2 | * | 8/2007 | Kuan et al. .................... 362/247 |
| 7,441,930 | B2 | * | 10/2008| Lin ................................ 362/410 |
| 7,658,506 | B2 | * | 2/2010 | Dowling ....................... 362/147 |
| 7,841,738 | B2 | * | 11/2010| Engel ............................ 362/235 |
| 7,980,728 | B2 | * | 7/2011 | Ramer et al. ............. 362/249.02 |

(Continued)

FOREIGN PATENT DOCUMENTS

| JP | 04276181 A      |   | 10/1992 |
| JP | 06131905        |   | 5/1994  |
| JP | 2003092006 A    | * | 3/2003  |
| WO | 2007054889 A2   |   | 5/2007  |
| WO | 2008146229 A2   |   | 12/2008 |

*Primary Examiner* — Ismael Negron
(74) *Attorney, Agent, or Firm* — John F. Salazar; Mark L. Beloborodov

(57) ABSTRACT

The illumination system includes a light source, a diffusing element and a specular back reflector. The light source is configured to emit light towards the specular back reflector reflecting at least part of the light emitted by the light source so as to illuminate the diffusing element. The specular back reflector is shaped to generate a substantially homogeneous distribution across the diffusing element of a light flux impinging on the diffusing element.

13 Claims, 5 Drawing Sheets

(56) References Cited

U.S. PATENT DOCUMENTS

| | | |
|---|---|---|
| 2006/0002141 A1 | 1/2006 | Ouderkirk et al. |
| 2006/0256578 A1 | 11/2006 | Yang et al. |
| 2007/0081361 A1 | 4/2007 | Clary |
| 2007/0171676 A1 | 7/2007 | Chang |
| 2010/0172152 A1* | 7/2010 | Boonekamp ................. 362/609 |
| 2011/0002682 A1* | 1/2011 | Messina ....................... 396/200 |
| 2011/0032698 A1* | 2/2011 | Kim .............................. 362/235 |

* cited by examiner

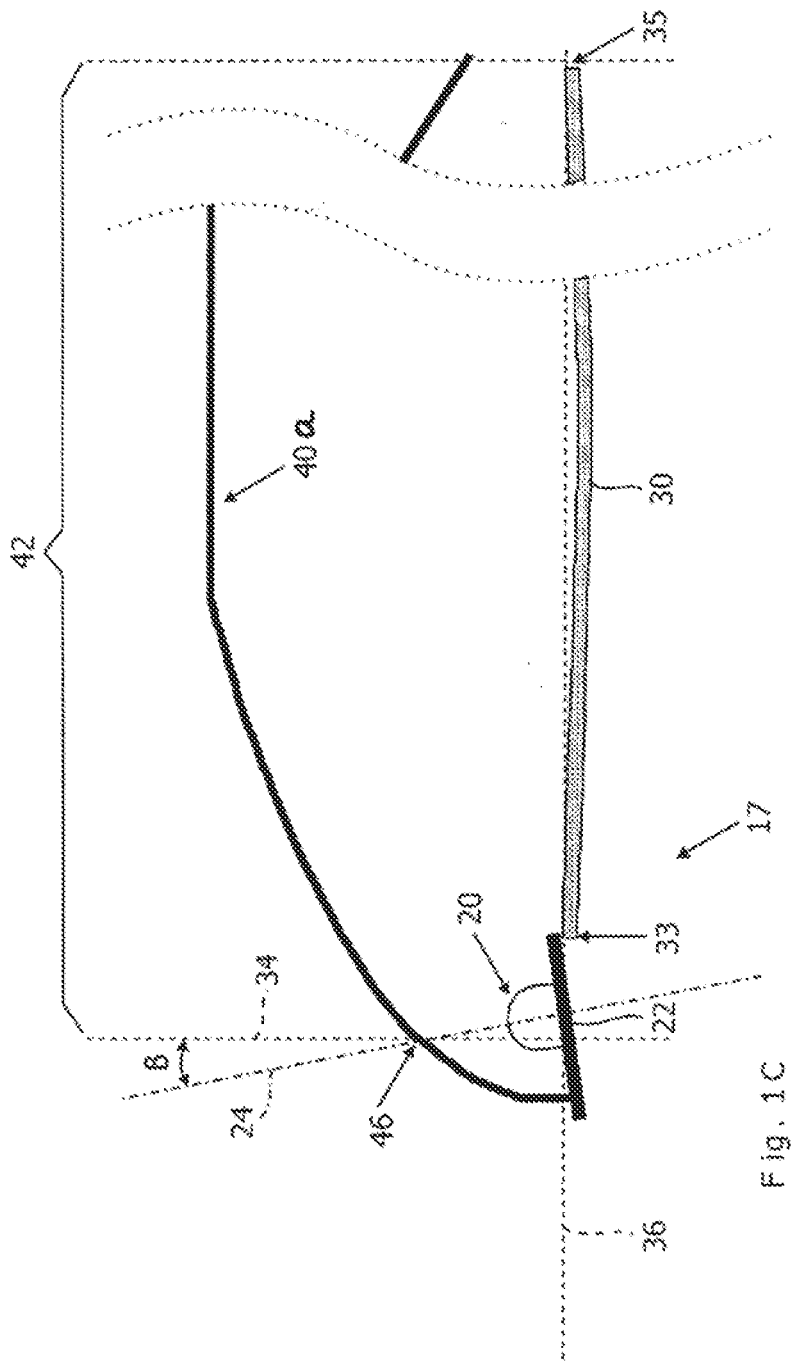

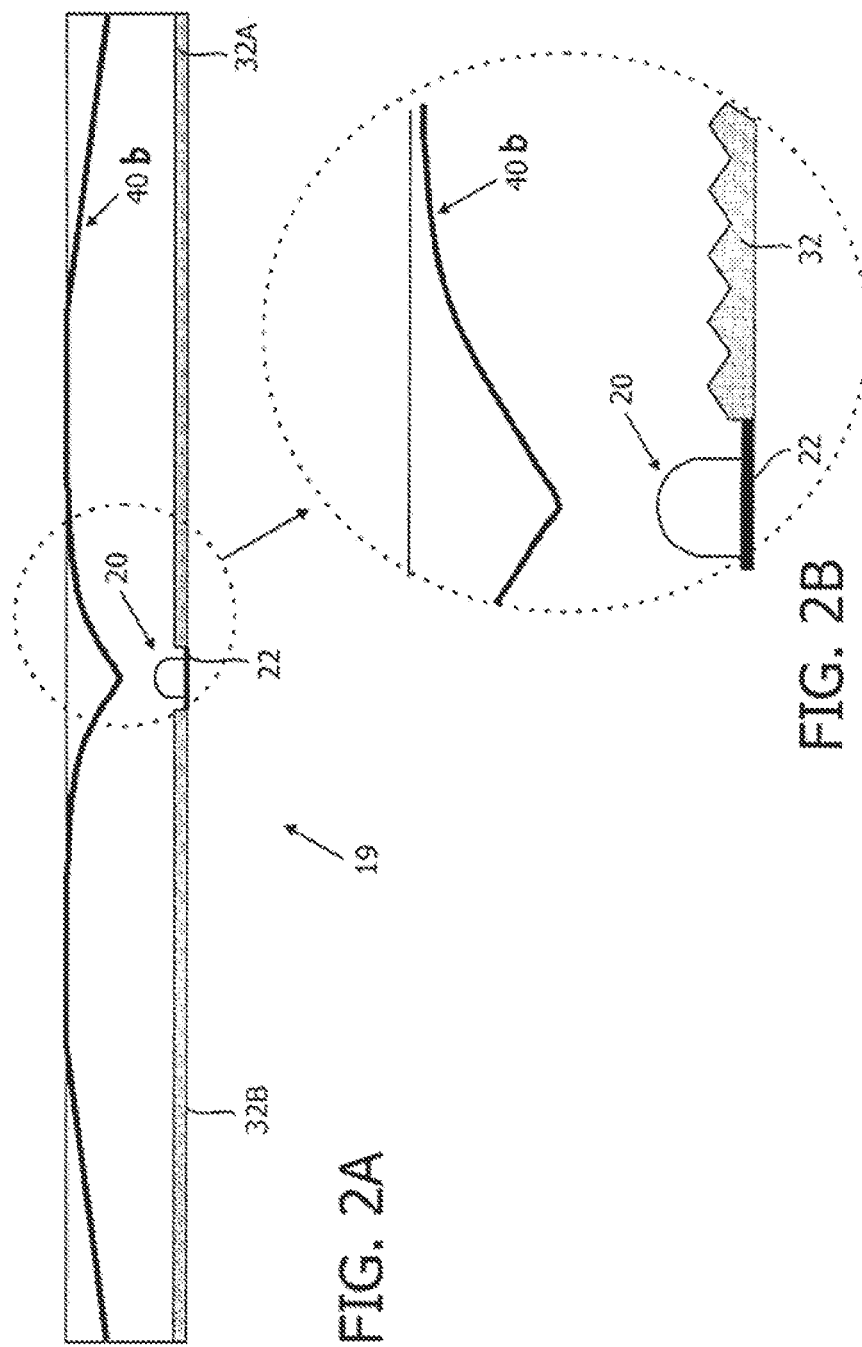

ILLUMINATION SYSTEM WITH INCLINED LIGHT SOURCE

FIELD OF THE INVENTION

The invention relates to an illumination system comprising a light source, a diffusing element and a specular back reflector.

The invention also relates to a luminaire comprising the illumination system according to the invention, a backlighting system comprising the illumination system according to the invention, and a display device comprising the backlighting system according to the invention.

BACKGROUND OF THE INVENTION

Such illumination systems are known per se. They are used, inter alia, as luminaires for general lighting purposes, for example, for office lighting, shop lighting or, for example, shop window lighting. Alternatively, these illumination systems are used for lighting (transparent or semi-transparent) plates of glass or (transparent) glass or synthetic resin plates on which, for example, jewelry is displayed. These illumination systems are also used for advertising boards illuminating, for example, a partially transparent image from the back of the image.

The known illumination systems may also be used as light sources in backlighting systems in (picture) display devices, for example, TV sets and monitors. Illumination systems of this type are particularly suitable for use as backlighting systems for non-emissive displays such as liquid crystal display devices, also denoted LCD panels, which are used in (portable) computers or (portable) telephones.

An illumination system of the type described above, used as a luminaire, is known from, for example, Japanese patent application JP 04-276181. The luminaire is arranged for indirect illumination via a reflector having a circular arc-shaped cross-section protruding upwards in the width direction and has a center projection gradually tapering downwards at the center section in the width direction. The luminaire comprises straight tube-type fluorescent lamps facing the reflecting surface of the reflector at both end sections in the width direction of the reflector housing with an opening. The known luminaire has the disadvantage that it has a relatively poor uniformity over its light-emitting window.

OBJECT AND SUMMARY OF THE INVENTION

It is an object of the invention to provide an illumination system having an improved uniformity.

According to a first aspect of the invention, the object is achieved with an illumination system as defined in claim 1. According to a second aspect of the invention, the object is achieved with a luminaire as defined in claim 12. According to a third aspect of the invention, the object is achieved with a backlighting system as defined in claim 13. According to a fourth aspect of the invention, the object is achieved with a display device as defined in claim 14. The illumination system according to the first aspect of the invention comprises a light source, a diffusing element and a specular back reflector, the light source being configured to emit light towards the specular back reflector reflecting at least part of the light emitted by the light source so as to illuminate the diffusing element, a shape of the specular back reflector generating a substantially homogeneous distribution across the diffusing element of a light flux impinging on the diffusing element.

The illumination system according to the invention has the effect that use of a specularly reflecting mirror allows controlled reflection of the light emitted by the light source towards the diffusing element. A substantially uniform distribution of the light flux across the diffusing element can be obtained by choosing a specific shape. The diffusing element converts the impinging light from the light flux into a predetermined angular light emission distribution, for example, a substantially Lambertian emission distribution from the diffusing element. In the known illumination system, a back reflector is used for generating indirect illumination of a room. This indirect illumination reduces glare which may be experienced by a user. Furthermore, the known illumination system comprises a light output window which is an open aperture so as to allow the reflected light to be spread into the room. This open aperture has a major disadvantage in that the angular spread of the light spreading into the room is fully determined by the back reflector. To generate a relatively wide spread of the light emitted from the known illumination system, the shape of the back reflector often resembles a parabola or an arc. However, when optimizing the angular distribution of the light emitted by the known illumination system, the luminance variation across the open aperture of the illumination system is generally not optimal. One possible way of overcoming this problem is to use a diffuse reflecting back reflector. Such a diffuse reflecting back reflector may relatively easily generate a predictable angular distribution of the light emitted by the known illumination system. However, typically additional measures are required to distribute the light evenly across the diffuse reflecting back reflector. These additional measures may be in the form of, for example, an additional reflecting element which, however, reduces the efficiency of the known illumination system.

The illumination system according to the invention generates a uniform distribution of the light across the diffusing element at a relatively high efficiency while generating a predictable angular distribution of the emitted light. This is realized by having the light source emit light towards the specular back reflector. The shape of the specular reflector generates a substantially uniform distribution of the flux of light across the light exit window. The shape of the specular reflector may be obtained by means of relatively common ray-tracing programs. The angle at which the light reflected from the specular back reflector impinges on the diffusing element may be different at every point of the diffusing element. The diffusing element converts light which impinges at different angles onto the diffusing element into light having a predetermined angular emission distribution which is emitted from the illumination system according to the invention. Currently, diffusing elements having a relatively high efficiency are available on the market. Due to the emission of light via the specular back reflector towards the diffusing element and due to the shape of the specular back reflector, a uniform distribution of the light flux impinging on the diffusing element can be generated while having a predictable angular distribution of the light emitted by the diffusing element of the illumination system according to the invention. Since the specular back reflector is the only reflecting element between the light source and the diffusing element, the illumination system according to the invention has a relatively high efficiency.

To generate a substantially uniform flux across the diffusing element, the shape of the specular back reflector depends on the emission distribution of the light source. When, for example, the light source is a light-emitting diode, which emits a substantially Lambertian emission profile, the reflector may have a shape different from that of a light-emitting diode having a different emission profile or when using different light sources.

In this document, a specular reflector is a layer which is characterized in that it has an angle of incidence which is equal to an angle of reflection, with a variation within a range of plus or minus five degrees on the angle of reflection. The angle of incidence is the angle at which the light impinges on the specular reflector, and the angle of reflection is the angle at which the light is reflected from the specular reflector. Of course, as compared to the angle of reflection, the angle of incidence is located on the opposite side of a normal axis at the reflection point on the specular reflector.

In an embodiment of the illumination system, the light source emits light around an axis of symmetry, wherein an angle between a tangent at the specular back reflector and an imaginary plane perpendicular to the axis of symmetry is equal to or less than 45°. When the angle between the tangent and the imaginary plane is 45° or less, the light reflected from the specular back reflector progresses in a direction having a component parallel to the axis of symmetry, allowing indirect illumination of the diffusing element which is arranged near the light source while using a single reflection from the specular back reflector. A relatively thin illumination system can be obtained by using such an arrangement for indirect illumination.

In an embodiment of the illumination system, the angle between the tangent at the specular back reflector and the imaginary plane is zero at a predetermined distance from the light source, wherein the angle between the tangent and the imaginary plane is equal to or less than 45° at a part of the specular back reflector facing the light source, said part extending up to the predetermined distance. This part extends from an edge of the specular back reflector near the light source up to the predetermined distance. When the distance increases, the angle between the tangent and the imaginary plane is reduced and the tangent rotates to a tangent which is parallel to the imaginary plane (having an angle equal to zero). The specular back reflector may have such a shape that, at larger distances, the tangent rotates even further so that the angle between the tangent and the imaginary plane becomes negative as compared to the angle between the distance and the edge of the specular back reflector near the light source. In such an embodiment, the specular back reflector extends towards the diffusing element.

In an embodiment of the illumination system, the axis of symmetry intersects the specular back reflector at a point of intersection, while the angle is equal to or less than 45° only at a further part of the specular back reflector, said further part of the specular back reflector facing the diffusing element by extending from the point of intersection away from the light source.

In an embodiment of the illumination system, light emitted from the light source and impinging on the diffusing element reaches the diffusing element after a single reflection from the specular back reflector. This embodiment has the advantage that use of the single reflection from the specular back reflector results in an increased efficiency. Any reflection apart from total internal reflection typically generates losses in an optical system. An illumination system having a relatively high efficiency is obtained by defining the shape of the specular back reflector so as to generate a substantially uniform flux across the diffusing element and by limiting the number of reflections to a single reflection, after which the emitted light reaches the diffusing element.

In an embodiment of the illumination system, the light source is arranged on a base facing the specular back reflector, the light source emitting light away from the base towards the specular back reflector. This embodiment has the advantage that this arrangement of the base prevents light from directly impinging on the diffusing element, which generally reduces the uniformity of the flux at the diffusing element. Furthermore, the prevention of direct impingement of the light from the light source on the diffusing element generally reduces glare which may be visible to the user of the illumination system. Glare results from excessive contrast between bright and dark areas in the field of view. Glare can result, for example, from directly viewing a filament of an unshielded or badly shielded light source. Arranging the planar base opposite the specular back reflector may make the light source invisible to the user and thus reduces glare.

In an embodiment of the illumination system, the diffusing element comprises a first edge near the light source and a second edge away from the light source, the first edge and the second edge defining an imaginary planar surface having a normal axis, the axis of symmetry of the light source defining a further angle to the normal axis, the further angle being within a range of plus or minus 30°. This embodiment has the advantage that the light source is inclined with respect to the imaginary planar surface of the illumination system. When, for example, the light source is inclined away from the diffusing element, the light source may be further shielded from the user, which further reduces glare of the illumination system according to the invention.

In an embodiment of the illumination system, the diffusing element comprises means for preventing reflection of the impinging light from the diffusing element back towards the specular back reflector. These means for preventing reflection may be, for example, an incoupling layer having, for example, a refractive index reducing the reflection of the impinging light, or, for example, a collimating plate arranged on the diffusing element. Alternatively, the means for preventing reflection of the impinging light may be constituted by a surface of the diffusing element being, for example, a structured surface so that light impinging at a relatively large angle on the diffusing element is not reflected from the diffusing element but redirected into the diffusing element.

In an embodiment of the illumination system, the specular back reflector is partially transmissive to part of the impinging light. This embodiment has the advantage that the partially transmissive specular back reflector enables part of the light emitted by the light source to be emitted in a different direction as compared to the diffusing element which may have to be used to illuminate, for example, a different part of a room. When, for example, the illumination system is used as a luminaire, the light emitted by the diffusing element illuminates the room, for example, directly, whereas the light transmitted by the specular back reflector illuminates the ceiling of the room and thereby indirectly illuminates the room. This may provide a uniform illumination of the room.

In an embodiment of the illumination system, the diffusing element comprises a luminescent material for converting at least part of the light emitted by the light source into light having a different color. Luminescent materials typically absorb light of a first color and emit light of a further color, typically uniformly in all directions. For example, when the light source is a blue LED, the diffusing element may comprise a luminescent material which converts at least part of the impinging blue light into yellow light. The emitted yellow light mixes with the remainder of the blue light so as to generate substantially white light. Use of a luminescent material at the diffusing element yields an arrangement referred to as remote phosphor arrangement. Generally, such a remote phosphor arrangement has a higher conversion efficiency as compared to, for example, the use of a phosphor-enhanced light-emitting diode as a light source. This is due to the reduced operating temperature of the remote phosphor as compared to the phosphor in the phosphor-enhanced light-emitting diode which typically is arranged on top of the light-emitting element of the light-emitting diode. Furthermore, the remote phosphor arrangement enables a larger range of luminescent materials to be used in the remote phosphor arrangement, again due to the reduced temperature of the luminescent material in the remote phosphor arrangement. Finally, use of the luminescent material enables the illumination system to have an improved color rendering index (also indicated as CRI). The luminescent material typically emits a relatively broad spectrum of light which improves the CRI. The luminescent material may be implemented and distributed in the diffusing element or applied to the diffusing element as an additional layer of luminescent material.

In an embodiment of the illumination system, the light source is a light-emitting diode, or an organic light-emitting diode, or a diode laser. This embodiment has the advantage that these light sources typically emit directional light which may be emitted towards the specular back reflector. When these light sources are used, substantially all light emitted by them may thus be directed in such a way that it reaches the diffusing element after a single reflection from the specular back reflector. As indicated hereinbefore, such an arrangement improves the efficiency of the illumination system according to the invention.

BRIEF DESCRIPTION OF THE DRAWINGS

These and other aspects of the invention are apparent from and will be elucidated with reference to the embodiments described hereinafter.

In the drawings:

FIGS. 1A, 1B and 1C are schematic cross-sectional views of an illumination system according to the invention, FIGS. 2A and 2B are schematic cross-sectional views of a luminaire comprising an alternative embodiment of the illumination system according to the invention.

The Figures are purely diagrammatic and not drawn to scale. Particularly for clarity, some dimensions are exaggerated strongly. Similar components in the Figures are denoted by the same reference numerals as much as possible.

DESCRIPTION OF EMBODIMENTS

Figure 1A:
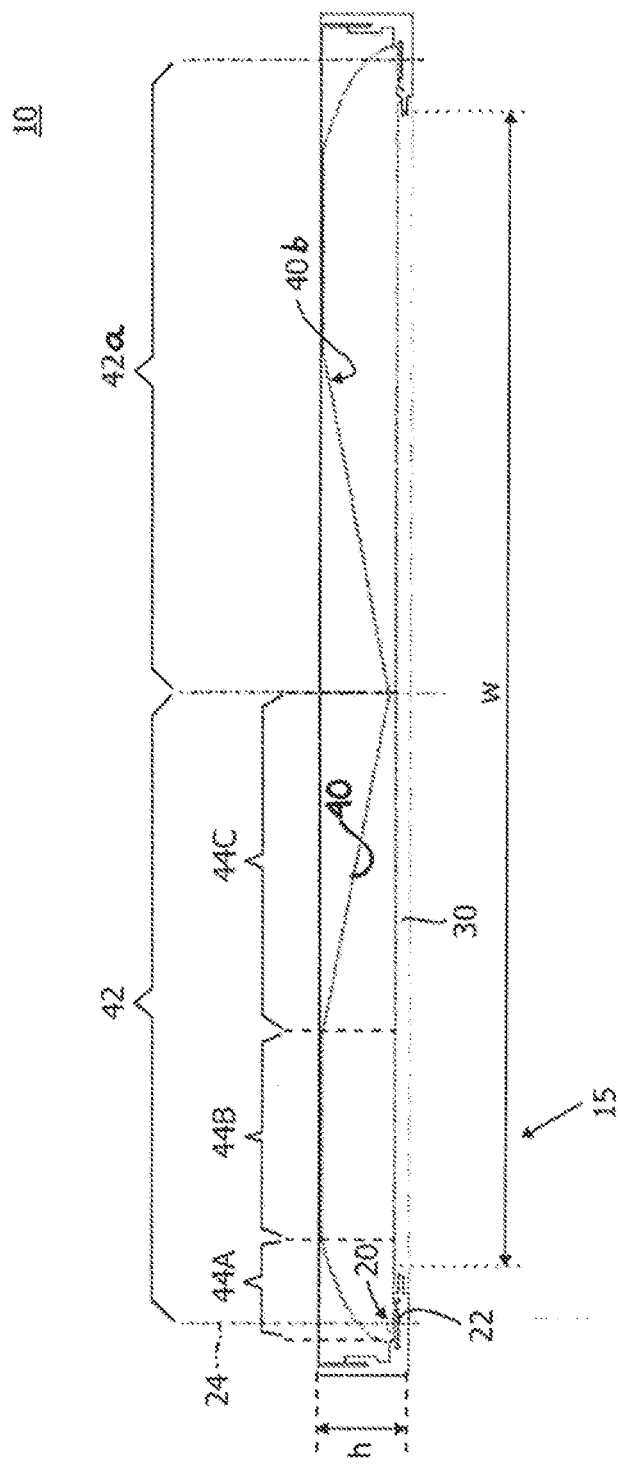
Figure 1B:
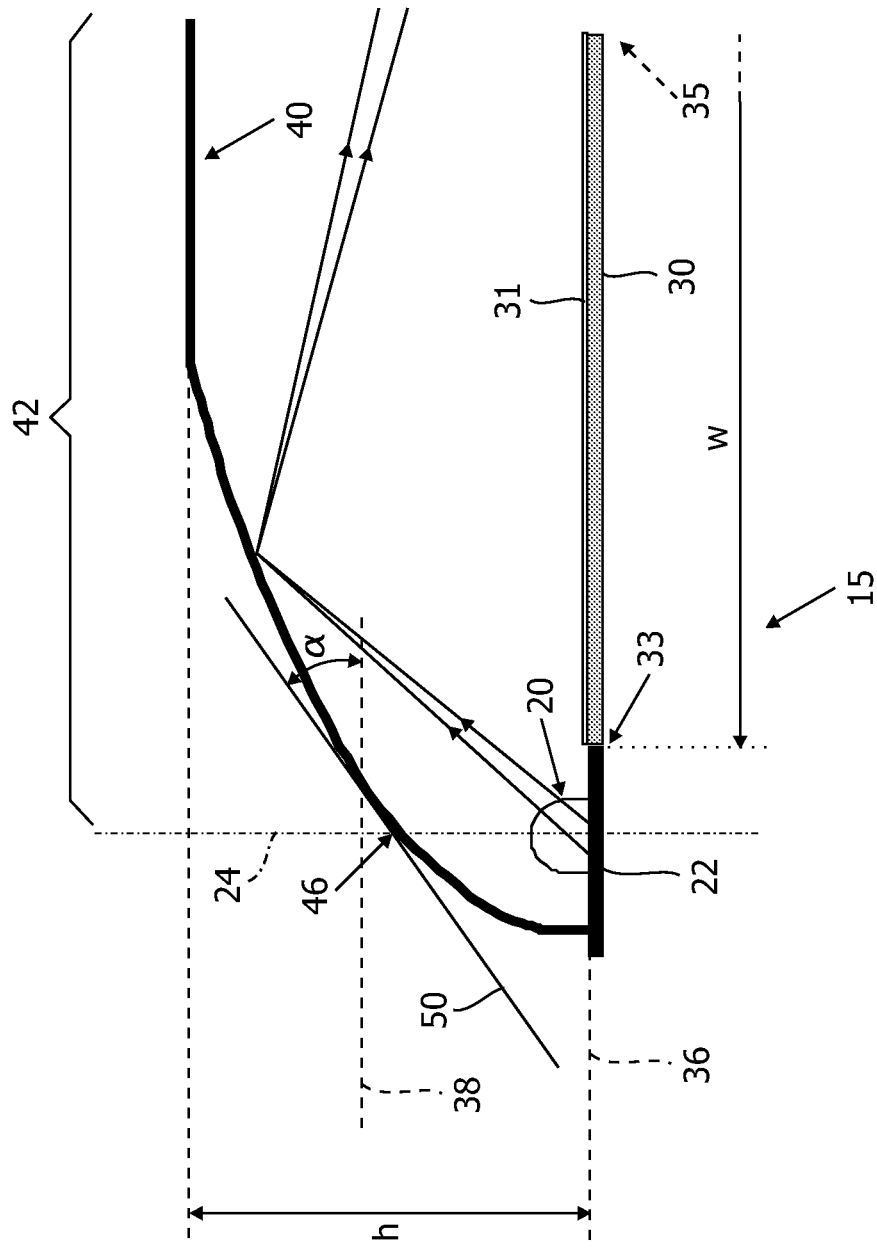

FIGS. 1A, 1B and 1C are schematic cross-sectional views of an illumination system 15, 17 according to the invention. The illumination system 15, 17 comprises a light source 20, a diffusing element 30 and a specular back reflector 40, 40a, 40b. In the embodiment shown in FIGS. 1A, 1B and 1C, the light source 20 is a light-emitting diode which is configured to emit light around an axis of symmetry 24 towards the specular back reflector 40. The light emitted by the light source 20 impinges on the specular back reflector 40 which reflects at least part of the impinging light from the light source 20 towards the diffusing element 30. The shape of the specular back reflector 40 generates a substantially homogeneous distribution across the diffusing element 30 of a light flux impinging on the diffusing element 30. This shape of the specular back reflector 40 may be generated, for example, by means of well-known ray-tracing programs.

In the known illumination systems, the back reflector is shaped to generate a predetermined angular distribution of the light reflected from the back reflector and emitted by the known illumination system. In the illumination system 15, 17 according to the invention, the shape of the specular back reflector 40 generates a homogeneous distribution of the light flux on the diffusing element 30. The angle at which the light impinges on the diffusing element 30 may thus vary substantially across the diffusing element 30. To control the angular distribution of the light emitted by the illumination system 15, 17, the illumination system 15, 17 comprises the diffusing element 30 which converts the angular distribution of the light impinging on the diffusing element 30 into a predetermined angular distribution of the light emitted by the illumination system 15, 17 according to the invention. Due to the combination of the specular back reflector 40 and the diffusing element 30, the distribution of the light flux impinging on the diffusing element 30 may thus be generated to be substantially homogeneous while controlling the angular distribution of the light emitted by the illumination system 15, 17. The efficiency of the illumination system 15, 17 depends on the efficiency of the diffusing element 30. The diffusing element 30 therefore comprises, for example, a PMMA or PC diffuser such as the commercially available translucent diffuser "Perspex Opal 040" from the manufacturer "Lucite", which has a relatively high efficiency and produces a substantially Lambertian emission distribution of the illumination system 15, 17 according to the invention. To further improve the efficiency of the illumination system 15, 17 according to the invention, the configuration of the light source 20 and the specular back reflector 40 causes the light emitted by the light source 20 to impinge on the diffusing element 30 after a single reflection from the specular back reflector 40.

In one embodiment of the illumination system 15, 17 according to the invention, substantially all light emitted by the light source 20 impinges on the diffusing element 30 after reflection at the specular back reflector generating an indirect illumination of the diffusing element 30 by the light source 20. This indirect illumination of the diffusing element 30 reduces glare of the illumination system 15, 17 according to the invention. In an alternative embodiment of the illumination system 15, 17, part of the light impinging on the specular back reflector is transmitted through the specular back reflector and is emitted in an opposite direction as compared to the diffusing element 30. Such an embodiment is especially advantageous when the illumination system 15, 17 is used in a luminaire which is used, for example, for illuminating a room (not shown). The part of the light transmitted through the specular back reflector may be used, for example, to illuminate a ceiling (not shown) of the room, while the light emitted by the illumination system through the diffusing element 30 may be used to illuminate other parts of the room.

Due to the use of the single reflection from the specular back reflector 40, a height h of the illumination system 15, 17 according to the invention may be further limited. The height h or thickness of the illumination system 15, 17 is a dimension of the illumination system 15, 17 in a direction substantially perpendicular to the imaginary planar surface 36 (see FIGS. 1B and 1C) of the illumination system 15, 17. The imaginary planar surface 36 is defined by a first edge 33 (see FIGS. 1B and 1C) of the diffusing element 30 near the light source 20 and a second edge 35 (see FIGS. 1B and 1C) of the diffusing element 30 away from the light source 20. A relation between a width w of the diffusing element 30 and a height h of the illumination system may be in the range of $$1/20 \leq \text{height/width} \leq 1/5.$$

In the embodiment in which the diffusing element 30 is a substantially planar element, the height h is a dimension of the illumination system 15, 17 substantially perpendicular to the diffusing element 30, and the width w of the diffusing element 30 is a minimum dimension of the diffusing element 30 substantially parallel to the diffusing element 30.

In the illumination system 15, 17 as shown in FIGS. 1A, 1B and 1C, the light source 20 is arranged on a base 22 which forms a ridge arranged at an edge of the diffusing element 30. Use of the ridge further reduces glare by keeping the light source 20 away from a user's direct line of sight. In the embodiment shown in FIGS. 1A, 1B and 1C, the diffusing element 30 is arranged next to base 22 of the light source 20. However, the base 22 and the diffusing element 30 may partially overlap.

FIG. 1A shows a luminaire 10 comprising the illumination system 15 according to the invention. The specular back reflector 40, 40b comprises a further part 42, 42a in which an angle α between a tangent 50 (see FIG. 1B) at the specular back reflector 40, 40b and an imaginary plane 38 (see FIG. 1B) perpendicular to the axis of symmetry 24 is equal to or less than 45°. In an alternative embodiment, the specular back reflector 40 may have such an overall shape that the tangent 50 and an imaginary plane 38 is equal to or less than 45°. The light source 20 is a light emitting diode 20 and is arranged on the base 22. In the embodiment of the specular back reflector 40 as shown in FIG. 1A, the specular back reflector 40 is divided into three reflecting regions 44A, 44B, 44C. A first reflecting region 44A comprises a curved reflecting region 44A for spreading the light emitted at a side of the axis of symmetry 24 away from the diffusing element 30 and back across the diffusing element 30. A second reflecting region 44B may be, for example, substantially flat and reflects a part of the emitted light back to the diffusing element 30, and a third reflecting region 44C is inclined towards the diffusing element 30 so as to limit the spreading of the light emitted by the light source 20 parallel to the diffusing element 30. The first reflecting region 44A is a part of the specular back reflector 40 facing the light source 20, in which an angle α between the tangent 50 and the imaginary plane 38 is equal to or less than 45°. The part 44A extends up to the predetermined distance. The part 44A extends from an edge of the specular back reflector 40 near the light source 20 up to the predetermined distance. When the distance from the edge of the specular back reflector 40 near the light source 20 increases, the angle between the tangent 50 and the imaginary plane 38 is reduced, and the tangent 50 rotates to a tangent 50 which is parallel to the imaginary plane 38 (having an angle equal to zero). The specular back reflector 40 may have such a shape that, at larger distances, for example, at the third reflecting region 44C, the tangent 50 rotates even further so that the angle α between the tangent 50 and the imaginary plane 38 becomes negative. The combination of the first reflecting region 44A, the second reflecting region 44B and the third reflecting region 44C generates the substantially homogeneous distribution of the light flux impinging on the diffusing element 30. An exact shape of the first reflecting region 44A, 44B and 44C may be determined by means of ray-tracing programs.

FIG. 1B is a detailed schematic cross-sectional view of the illumination system 15 according to the invention. The reflecting further part 42 is configured in such a way that the tangent 50 at any point of the reflecting further part 42 defines the angle α to the imaginary plane 38 perpendicular to the axis of symmetry 24, in which the angle α is smaller than or equal to 45°. A relatively thin illumination system can then be obtained, because the light emitted by the light source 20 towards the specular back reflector 40 is reflected back to the diffusing element 30.

In the embodiment of the illumination system 15 as shown in FIG. 1B, the diffusing element 30 comprises a layer 31 having a luminescent material. The layer 31 is further also indicated as remote phosphor layer 34. In the embodiment shown in FIG. 1B, the remote phosphor layer 31 is applied to a surface of the diffusing element 30. This embodiment has the advantage that the remote phosphor layer 31 can be applied relatively easily, for example, before assembling the diffusing element 30 to the illumination system 15. However, the luminance uniformity at the diffusing element 30 is relatively strongly dependent on the uniformity of the remote phosphor layer 31 and on the uniformity of the distribution in the luminescent material in the remote phosphor layer 31. Alternatively, the luminescent material may be distributed throughout the diffusing element 30 on that the diffusing element 30 acts as the remote phosphor layer. Each of these embodiments using luminescent materials generates what is called a remote phosphor configuration having the advantages of an improved efficiency and a wider range of luminescent materials to choose from, because the operating temperature of the phosphor arranged at the remote phosphor configuration is generally lower than that of the configuration in which the luminescent material is applied directly on the light source 20.

The remote phosphor layer 31 and the diffusing element 30 may comprise a single luminescent material or a mixture of a plurality of different luminescent materials.

In a preferred embodiment, the light source 20 emits substantially blue light. Part of the blue light will be converted, for example, using $Y_3Al_5O_{12}:Ce^{3+}$ (further also referred to as YAG:Ce) which converts part of the blue impinging light into yellow light. Choosing a specific density of the luminescent material causes a predetermined part of the impinging blue light to be converted into yellow, determining the color of the light emitted by the illumination system 15. The ratio of blue light which is converted by the luminescent material may be determined, for example, by a layer thickness of the remote phosphor layer, or, for example, by a concentration of the YAG:Ce particles distributed in the remote phosphor layer or the diffusing element 30. Alternatively, for example, $CaS:Eu^{2+}$ (further also referred to as CaS:Eu) may be used, which converts part of the blue impinging light into red light. Adding some CaS:Eu to the YAG:Ce may result in white light having an increased color temperature. Alternatively, the light-emitting diode 20 emits ultraviolet light which is converted by the luminescent material into substantially white light. For example, a mixture of $BaMgAl_{10}O_{17}:Eu^{2+}$ (converting ultraviolet light into blue light), $Ca_8Mg(SiO_4)_4Cl_2:Eu^{2+}, Mn^{2+}$ (converting ultraviolet light into green light), and $Y_2O_3:Eu^{3+}, Bi^{3+}$ (converting ultraviolet light into red light) with different phosphor ratios may be used to choose a color of the light emitted from the illumination system 15 in a range from relatively cold white to warm white, for example, between 6500K and 2700K. Other suitable luminescent materials may be used to obtain a required color of the light emitted by the illumination system 15.

FIG. 1C is a detailed schematic cross-sectional view of the illumination system 17 in which the base 22 on which the light source 20 is arranged is inclined with respect to the diffusing element 30. In the detailed cross-sectional view, part of the illumination system 17 is not shown, which is indicated by dotted wavy lines. This has been done to be able to show the first edge 33 and the second edge 35 of the diffusing element 30 defining the imaginary planar surface 36. A further angle β is defined between the normal axis of the imaginary planar surface 36 and the axis of symmetry 24 of the light source 20. The further angle β may be, for example, in a range between −30° and +30°:

$$-30° \leq \beta \leq +30°.$$

The inclination between the base 22 and the diffusing element 30 is preferably such that glare may be further reduced. This may be realized, for example, by providing the further angle β as indicated in FIG. 1C. Due to the arrangement as shown in FIG. 1C, substantially no light emitted by the light source 20 impinges on the diffusing element 30, so that the light source 20 is substantially not visible to a user and further reduces the glare experienced by a user.

FIGS. 1A, 1B and 1C are only cross-sectional views of the luminaire 10 according to the invention. In this cross-sectional view, the luminaire 10 in a three-dimensional view (not shown) may have a disc shape or an elongated, substantially rectangular shape, or any other shape as long as the shape of the specular back reflector 40, 40a, 40b generates a substantially homogeneous distribution of the light flux across the diffusing element of the illumination system 15, 17 and of the luminaire 10.

FIGS. 2A and 2B are schematic cross-sectional views of a luminaire 12 comprising an alternative embodiment of the illumination system 19 according to the invention. In the embodiment of the illumination system 19 as shown in FIGS. 2A and 2B, the light source 20 is arranged on the base 22, and the illumination system 19 comprises a diffusing element 32 having two diffusing elements 32A, 32B arranged on either side of the light source 20. The shape of the specular back reflector 40, 40b reflects part of the light emitted by the light source 20 towards a first diffusing element 32A of the two diffusing elements 32 and the rest of the light emitted by the light source 20 towards a second diffusing element 32B of the two diffusing elements 32. Alternatively, the diffusing element 32 may have, for example, a disc shape, with the light source 20 being arranged substantially in the center of the disc (see the cross-sectional view in FIGS. 2A and 2B). Also alternatively (not shown), the diffusing element 32 may be a single continuous diffusing element in which the light source 20 is arranged between the diffusing element 32 and the specular back reflector 40, 40b. In such an embodiment, the arrangement of the light source 20 and the shape of the specular back reflector 40, 40b may be such that the light flux impinging on the whole of the diffusing element is homogeneously distributed across the diffusing element 32.

In the embodiment of the illumination system 19 shown in FIG. 2B, the diffusing element 32 comprises means 37 for preventing reflection of the impinging light. In the embodiment shown in FIG. 2B, the means 37 comprise a structured surface. The cross-sectional view in FIG. 2B may be, for example, a cross-sectional view of elongated prismatic structures, or a cross-sectional view of a plurality of pyramidal structures, or a cross-sectional view of a plurality of conical structures. The effect of this structured surface is to prevent light, which impinges on the diffusing element 32 at grazing angles, from reflecting from the diffusing element 32. Such reflected light typically reduces the efficiency of the illumination system 17 according to the invention.

Alternatively, the means 37 for preventing reflection of the impinging light may be a collimating plate (not shown) which redirects a light beam towards a normal axis (not shown) of the diffusing element 30. This collimating plate is, for example, a transparent prismatic sheet commercially known as, for example, Transmissive Right Angle Film (also known as TRAF), or Brightness Enhancement Film (also known as BEF) or Dual Brightness Enhancement film (also known as DBEF) or Optical Lighting Foil (also known as OLF). These substantially transparent prismatic sheets redirect the light impinging at grazing angles so as to impinge on the diffusing element 30 at an angle closer to a normal of the diffusing element 30. This prevents reflection of light at grazing angles from the diffusing element 30.

Figure 3:
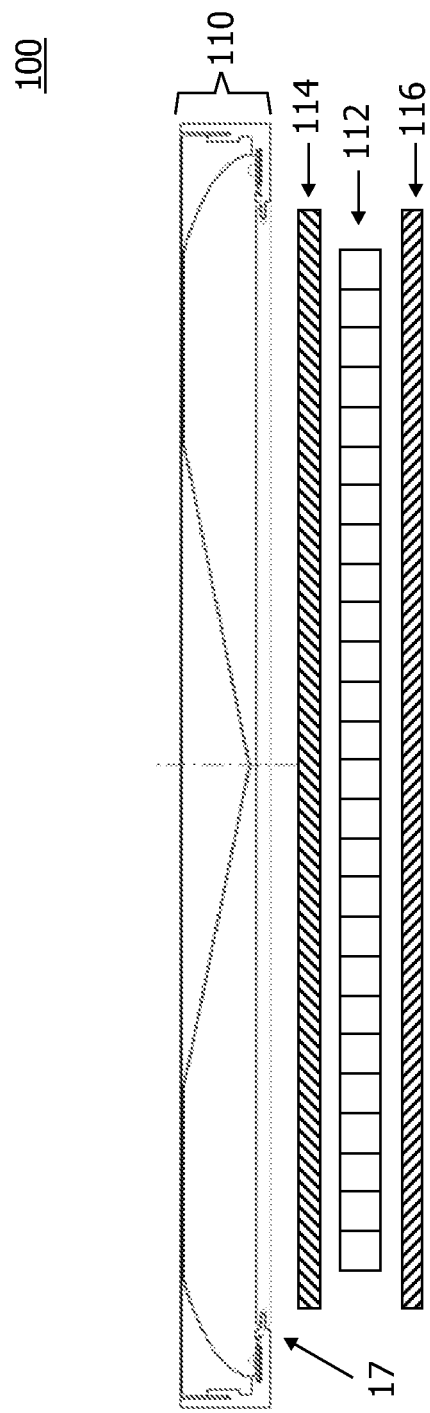
FIG. 3 is a schematic cross-sectional view of a backlighting system and a display device according to the invention.

FIG. 3 is a schematic cross-sectional view of a backlighting system 110 and a display device 100 according to the invention. The display device 100 may be, for example, a liquid crystal display device which comprises a layer of electrically connected (not shown) liquid crystal cells 112, a polarizing layer 114, and an analyzing layer 116. Alternatively, the display device 100 may be any other non-emissive display device 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising a light source, a diffusing element and a specular back reflector, the light source being configured to emit light towards the specular back reflector reflecting at least part of the light emitted by the light source so as to illuminate the diffusing element, a shape of the specular back reflector generating a substantially homogeneous distribution across the diffusing element of a light flux impinging on the diffusing element, wherein the diffusing element comprises a first edge near the light source and a second edge away from the light source, the first edge and the second edge defining an imaginary planar surface having a normal axis, an axis of symmetry of the light source defining a further angle (β) to the normal axis, the further angle (β) being within a range of plus or minus 30°.

2. An illumination system as claimed in claim 1, wherein light emitted from the light source and impinging on the diffusing element reaches the diffusing element after a single reflection from the specular back reflector.

3. An illumination system as claimed in claim 1, wherein the light source is arranged on a base facing the specular back reflector, the light source emitting light away from the base towards the specular back reflector.

4. An illumination system as claimed in claim 1, wherein the diffusing element comprises means for preventing reflection of the impinging light from the diffusing element back towards the specular back reflector.

5. An illumination system as claimed in claim 1, wherein the specular back reflector is partially transmissive to part of the impinging light.

6. An illumination system as claimed in claim 1, wherein the diffusing element comprises a luminescent material for converting at least part of the light emitted by the light source into light having a different color.

7. An illumination system as claimed in claim 1, wherein the light source is a light-emitting diode, or an organic light-emitting diode, or a laser diode.

8. An illumination system as claimed in claim 1, wherein the light source emits light around the axis of symmetry, and wherein an angle ($\alpha$) between a tangent at the specular back reflector and an imaginary plane perpendicular to die axis of symmetry is equal to or less than 45°.

9. An illumination system as claimed in claim 8, wherein the angle ($\alpha$) between the tangent and the imaginary plane is zero at a predetermined distance from the light source, and the angle ($\alpha$) between the tangent and the imaginary plane is equal to or less than 45° at a part of the specular back reflector facing the light source, said part extending up to the predetermined distance.

10. An illumination system as claimed in claim 8, wherein the axis of symmetry intersects the specular back reflector at a point of intersection (46), and wherein the angle ($\alpha$) is equal to or less than 45° only at a further part of the specular back reflector, said further part of the specular back reflector facing the diffusing element by extending from the point of intersection (46) away from the light source.

11. An illumination system, comprising:
a light source defining an axis of symmetry,
a diffusing element including a first edge near the light source and a second edge away from the light source, the first edge and the second edge defining an imaginary planar surface having a normal axis, the axis of symmetry of the light source defining an angle $\beta$ to the normal axis, the angle $\beta$ being within a range of about plus or minus 30 degrees; and
a specular back reflector;
wherein the light source is configured to emit light towards the specular back reflector to reflect at least part of the light emitted by the light source on as to illuminate the diffusing element, a shape of the specular back reflector generating a substantially homogeneous distribution of a light flux impinging across the diffusing element;
wherein the diffusing element includes a structured surface for preventing reflection of the impinging light from the diffusing element back towards the specular back reflector.

12. An illumination system, comprising:
a light source defining an axis of symmetry;
a diffusing element including a first edge near the light source and a second edge away from the light source, the first edge and the second edge defining an imaginary planar surface having a normal axis, the axis of symmetry of the light source defining an angle $\beta$ to the normal axis, the angle $\beta$ being within a range of about plus or minus 30 degrees;
a specular back reflector;
wherein the light source is configured to emit light towards the specular back reflector to reflect at least part of the light emitted by the light source to illuminate the diffusing element, a shape of the specular back reflector generating a substantially homogeneous distribution of a light flux impinging across the diffusing element; and,
wherein the specular back reflector is partially transmissive to part of the impinging light.

13. An illumination system, comprising:
a light source defining an axis of symmetry,
a diffusing element including a first edge near the light source and a second edge away from the light source, the first edge and the second edge defining an imaginary planar surface having a normal axis, the axis of symmetry of the light source defining an angle $\beta$ to the normal axis, the angle $\beta$ being within a range of about plus or minus 30 degrees;
a specular back reflector;
wherein the light source is configured to emit light towards the specular back reflector to reflect at least part of the light emitted by the light source to illuminate the diffusing element, a shape of the specular back reflector generating a substantially homogeneous distribution of a light flux impinging across the diffusing element; and
wherein the diffusing element comprises a luminescent material for converting at least part of the light emitted by the light source into light having a different color.

* * * * *